United States Patent [19]

Oba

[11] Patent Number: 5,381,353
[45] Date of Patent: Jan. 10, 1995

[54] SCIENTIFIC ELECTRONIC CALCULATOR FOR PERFORMING MATHEMATICAL OPERATIONS WITH PREDETERMINED PRIORITY

[75] Inventor: Toshiro Oba, Nara, Japan

[73] Assignee: Sharp Kabushiki Kaisha, Osaka, Japan

[21] Appl. No.: 73,661

[22] Filed: Jun. 8, 1993

[30] Foreign Application Priority Data

Jun. 10, 1992 [JP] Japan .................. 4-150586

[51] Int. Cl.⁶ .............................. G06F 3/147
[52] U.S. Cl. ....................: 364/710.08; 364/710.11
[58] Field of Search ............ 364/710.08, 709.12, 364/710.11

[56] References Cited

U.S. PATENT DOCUMENTS

| | | | |
|---|---|---|---|
| 4,159,525 | 6/1979 | Olander, Jr. et al. | 364/710.08 |
| 4,695,983 | 9/1987 | Oda et al. | 364/709.12 |
| 4,718,029 | 1/1988 | Morino et al. | 364/710.08 |
| 5,285,399 | 2/1994 | Nishiguchi et al. | 364/709.12 |

FOREIGN PATENT DOCUMENTS 53-106538  9/1978  Japan .
55-147747 12/1980  Japan .

Primary Examiner—David H. Malzahn
Attorney, Agent, or Firm—Nixon & Vanderhye

[57] ABSTRACT

Scientific electronic calculator comprising an input device such as a keyboard for inputting operational information including the operands and operators to the calculator, a display device for displaying the input operational information and results of performed mathematical operations, a central processing unit for controlling the input of the operational information, operations and displays, a first storage memory composed of a ROM for storing a program of sequential operations to be executed by the central processing unit, a second storage device composed of a RAM for storing numeric values and expression operands, and a storage and display buffer device composed of a RAM for preparing an operand assembly having the order of a parenthesis open, the numeral, numerical term or numerical expression operands stored in the second storage device, and a parenthesis close. In operation, the calculator instructs the central processing unit to display an operand assembly prepared in the storage and display buffer device in the display device in response to an instructions by the input device to display the numerical stored in the second storage device.

2 Claims, 7 Drawing Sheets

[(-)] [4] [sto] [A]

$-4\,sto\,A$
$-4.$

[rcl] [A] [x²] [=]

$-4^2 =$
$-16.$ $-(4^2)$
$= -16$

SCIENTIFIC ELECTRONIC CALCULATOR FOR PERFORMING MATHEMATICAL OPERATIONS WITH PREDETERMINED PRIORITY

BACKGROUND OF THE INVENTION

1. Field of the Invention

The present invention relates to a scientific electronic calculator and, more particularly to a scientific electronic calculator for reading and displaying numeric values or expressions which are stored in the memories thereof.

2. Description of the Prior Art

With a conventional scientific electronic calculator for performing calculations by inputting numeric values, expressions and functions thereto, operations are performed not in the entry sequence of numeric values, expressions and functions, but by a predetermined priority of the function inputted. When the calculation of "$-4^2$" is to be performed, for example, the [−] key, [4] key, [X$^2$] key, and [=] keys are sequentially depressed for entry in that order, as shown in FIG. 7(a), so as to provide the result "−16". The result "−16" was obtained by calculating $4^2$ first to provide "16" and then attaching the "−" sign preceding to "16", because the operation of square has priority over "−". In this case, the same result is obtained as that of the general numeric operation.

In addition to "−" and "4", the calculator also stores "−4" in its memory. When "−4" is read from the memory for display, the display exhibits "−4", which is also exhibited when the [−] and [4] keys are successively depressed.

When calculations are performed with the scientific electronic calculator having the aforesaid operational priority, different results may be produced depending on whether calculations are carried out by using numeric values read from the memory, or by using numeric values stored in the memory under a memory name, for the signs preceding to the numeric values may be treated differently in each case, depending on the operational priority of the function inputted. FIG. 7 shows a conventional method of displaying numeric values. By way of example, a case where "−4" is stored in the memory "A" as shown in FIG. 7(b) will be described.

There are two methods of squaring the memory "A". One is to utilize the memory name "A" for calculations. Here, the [A] key, [X$^2$] key, and [=] key are successively depressed as shown in FIG. 7(c), resulting in 16. The other is to read the numeric value from the memory "A" for display and then perform calculations by using it. In this case, the [rcl] key, [A] key, [X$^2$] key, and [=] key are successively depressed as shown in FIG. 7(d), resulting in −16. The [rcl] key here is for requesting the operation of reading a numeric value from a selected memory.

In the first method, A is treated as a whole variable so that "A$^2$" is displayed and that the numeric value stored in the memory "A" itself is squared in operations. In the second method, however, the successive entry of [rcl] and [A] reads out "−4" to be displayed, which is treated similarly to the case where the [−] key and [4] key are successively depressed. Consequently, calculations are carried out with the numeric expression −4$^2$ displayed so as to provide the result "−16", because the square function, which is subsequently inputted by depression of the [X$^2$] key, has priority over "−" in operation.

As described above, the conventional scientific electronic calculator is disadvantageous in that even if a numeric value stored in a memory is to be used to calculate a function, the result is sometimes different from the intended one because the calculator is so designed that numeric values or variables being displayed are used to calculate the function in accordance with a predetermined priority.

Japanese Unexamined Patent Publication No. 55-147747 discloses an electronic calculator which is constituted so that in performing calculations with parentheses, it displays left-hand parentheses "(" which are inputted via a left-hand parenthesis key upon entry of numeric expressions and which are the same in number as uncompleted operations.

Japanese Unexamined Patent Publication No. 53-106538 discloses a method of controlling the register of a calculator. The object of the invention is to effectively use the register for storing information on performing calculations with parentheses.

SUMMARY OF THE INVENTION

The present invention provides a scientific electronic calculator for performing operations with functional operators and inputted numeric values, numeral terms, and expressions as operand in accordance with a predetermined operational priority, comprising: an input means for inputting operational information including the operands and the operators to the calculator; a display means for displaying the inputted operational information and results of performed mathematical operations; a control means for controlling the input of the operational information, the operations, and displays; a first storage means for storing a program which instructs a sequence of procedures to be carried out by the control means; a second storage means including a plurality of storages for storing the numeral, numeral term, and numeral expression operands; and a storage and display buffer means for preparing an operand assembly having the order of a parenthesis open, the numeral, numeral term, and numeral expression operands stored in the second storage means, and a parenthesis close, whereby the control means instructs, in response to an instruction by the input means to display the numeral, numeral term, or numeral expression operands stored in the second storage means in the display means, the operand assembly prepared in the storage display buffer means to be displayed in the display means.

The input means preferably comprises a read key for instructing a specific readout of numeric values, numeral terms, expression operands stored in the second storage means and a choice key for choosing a desired means in the plurality of the storages of second storage means.

BRIEF DESCRIPTION OF THE DRAWINGS

FIGS. 7a–7d is a view illustrating an example of displaying numeric values with a conventional scientific electronic calculator.

DESCRIPTION OF THE PREFERRED EMBODIMENTS

An embodiment of the present invention will be described below with reference to drawings.

The present invention is preferably applied to a scientific electronic calculator, particularly to a pocket scientific electronic calculator with scientific calculating functions. However, the present invention is also applicable to a variety of calculators from large-sized to small-sized calculators.

An embodiment which will be described below was obtained by applying the present invention to a pocket scientific electronic calculator. The present invention can be applied to a calculator of this type by adding constitutions which are necessary to perform the functions of the present invention to a calculator which already has basic functions of a typical scientific electronic calculator.

Figure 1:
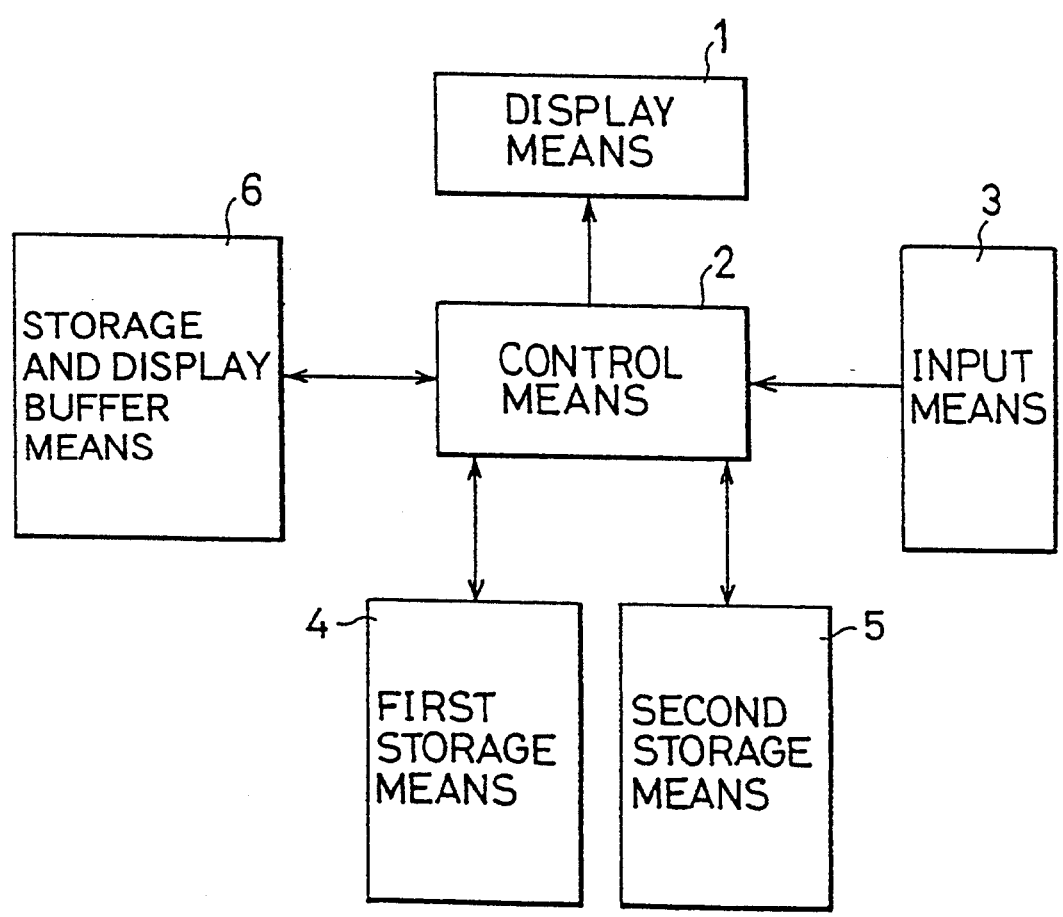
FIG. 1 is a block diagram showing the constitution of a scientific electronic calculator of the present invention.

FIG. 1 is a block diagram showing the basic constitution of a scientific electronic calculator of the present invention, wherein 1 designates a display means composed of a LCD (liquid crystal display) or an EL display device, 2 designates a control means typically composed of a CPU (central processing unit), 3 designates an input means composed of an input device such as a keyboard, a pointing device or a touch sensor, 4 designates a first storage means composed of a ROM in which a program or the like is stored, 5 designates a second storage means composed of a RAM, and 6 designates a storage and display buffer means composed of a RAM.

Figure 6:
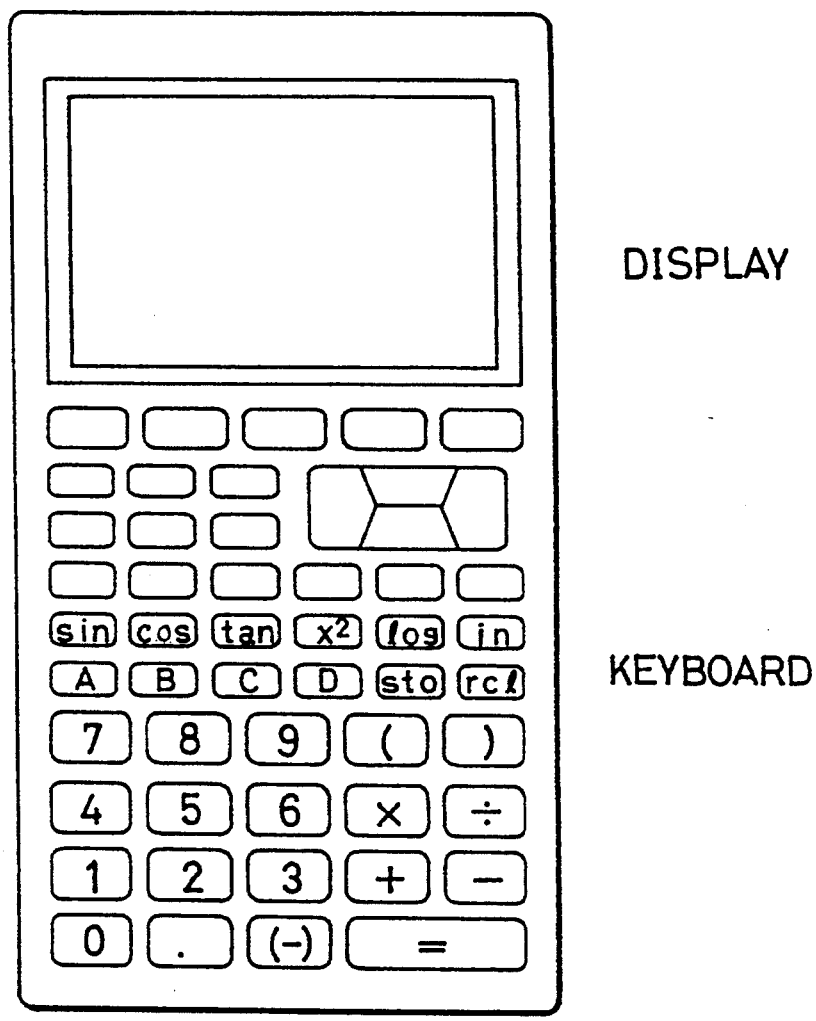
FIG. 6 is a view showing the outward appearance of the embodiment of the scientific electronic calculator of the present invention.

FIG. 6 is a view showing the outward appearance of an embodiment of the scientific electronic calculator of the present invention. The calculator consists of a display and a keyboard.

The [sin], [cos], [tan], [X$^2$], [log], [ln], [(], [)], [×], [÷], [+], and [−] keys are function keys to act as operator in the calculations.

The [A], [B], [C], and [D] keys are for selecting a memory name in order to store and read numeric values, numeral term, or expressions in and from a memory to act as operand. The A, B, C, and D represent memory names.

The [sto] key is for storing data in a selected memory.

The [rcl] key is for reading out numeric values from a specified memory.

The [0], [1], [2], [3], [4], [5], [6], [7], [8], [9], [.], and [(−)] keys are for inputting numeric values. The [=] key is for executing operations.

Figure 2:
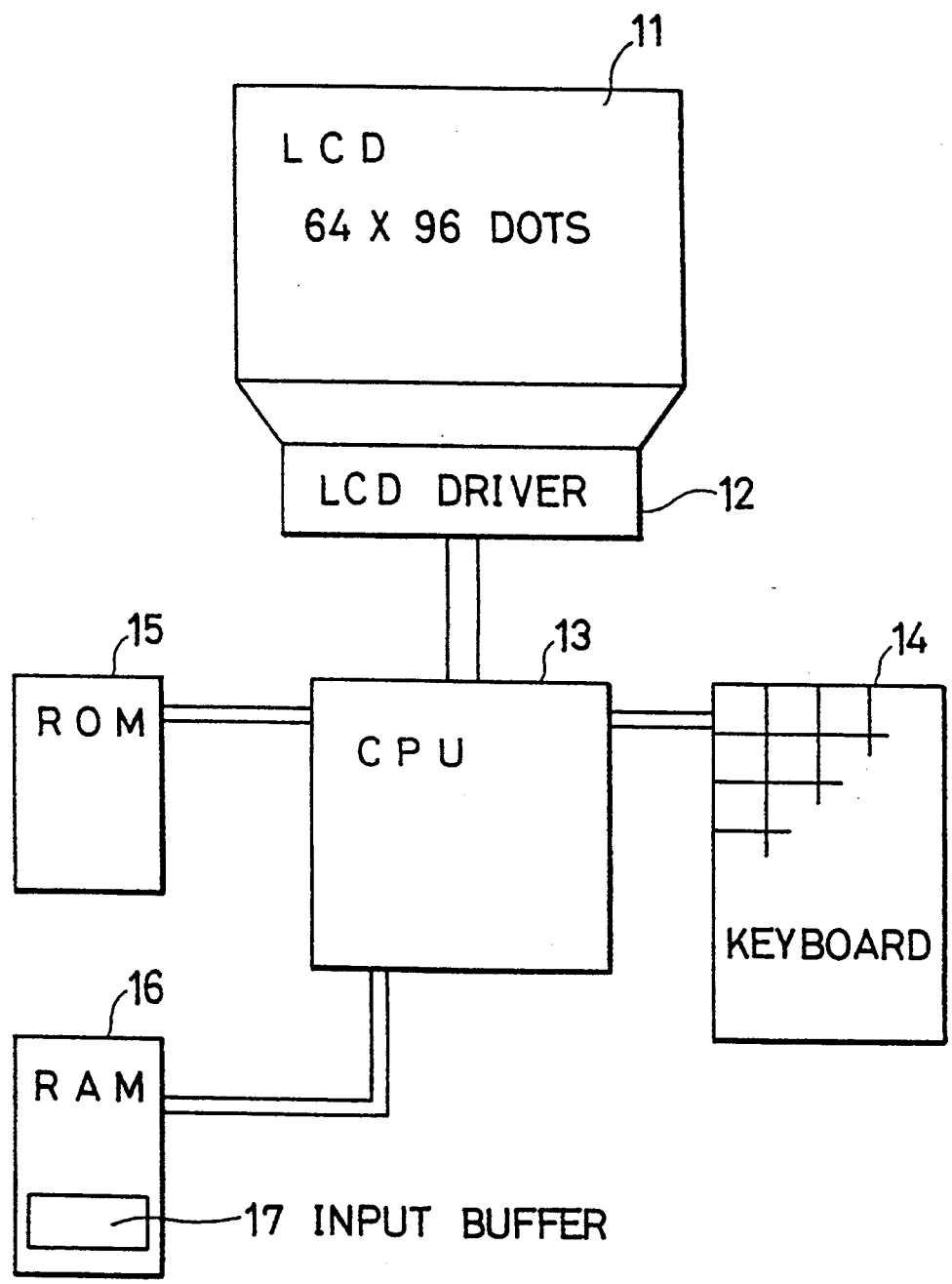
FIG. 2 is a block diagram of an embodiment of the scientific electronic calculator of the present invention.

FIG. 2 is a block diagram of the embodiment of the scientific electronic calculator of the present invention.

The CPU 13 is a device for executing and controlling keyboard entry, operation, and display of inputted data and of the result of operation.

The ROM 15 is a device for storing programs which execute and control keyboard entry, operation, and display of inputted data and of the result of operation.

The RAM 16 is a device for storing information which executes and controls keyboard entry, operation, and display of inputted data and of the result of operation and for storing a numeric value as a memory.

The keyboard 14 consists of keys for inputting information to the calculator so as to carry out operations.

The LCD 11 is a device for displaying inputted information and the result of operation.

The LCD driver 12 is a control device whereby display information provided by the CPU is displayed on the LCD.

The RAM is internally provided with an input buffer 17 for storing inputted numeric values or expressions. The numeric values or expressions stored in the input buffer are displayed on the LCD so that operations are performed by the priority of a function.

Figure 3:
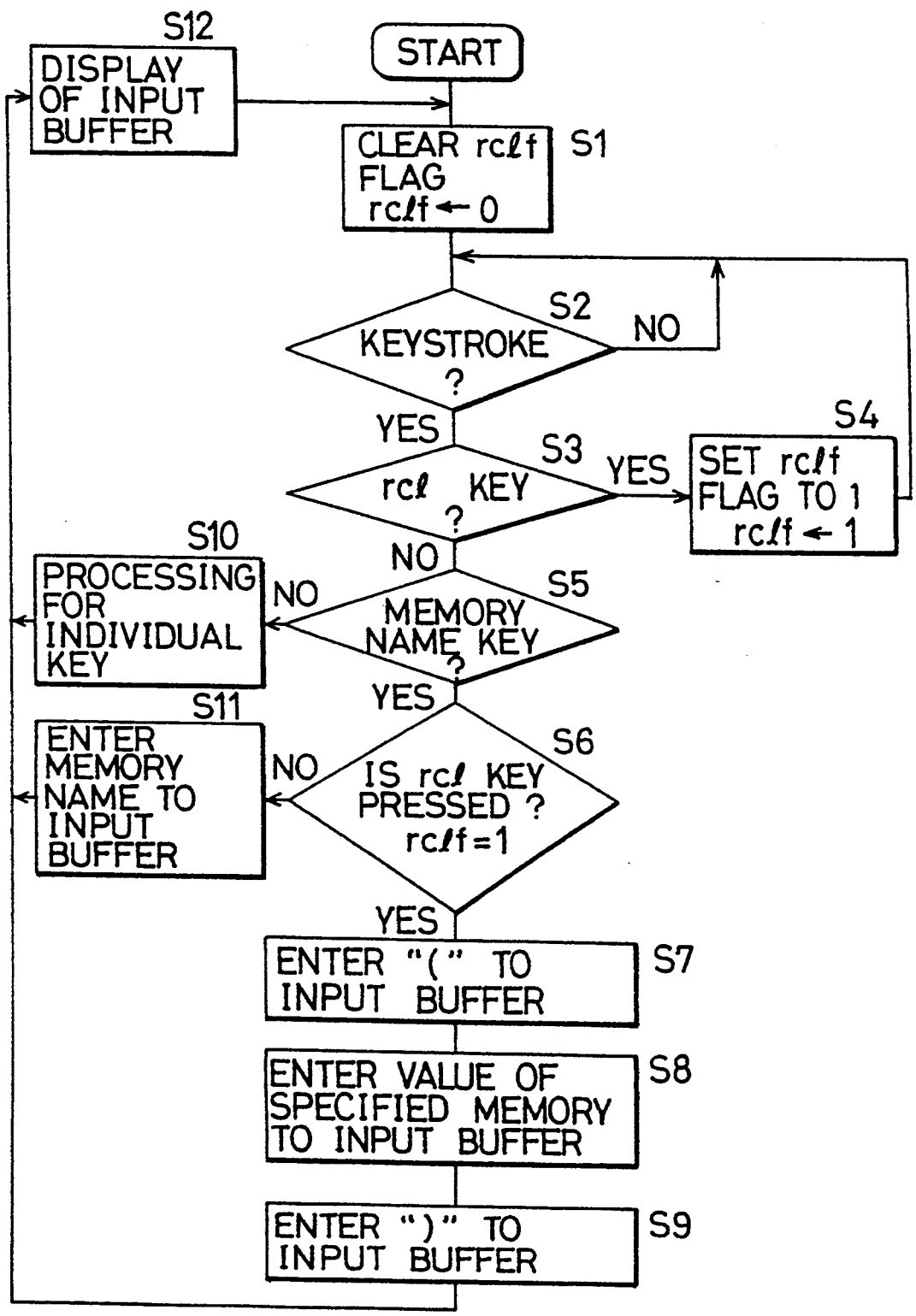
FIG. 3 is a flow chart of the embodiment of the present invention.

FIG. 3 shows a flow chart of a method of displaying numeric values in accordance with the present invention. The method of reading the content of a memory is practiced by sequential depression of the [rcl] and [memory name] keys, following which the content of the memory is enclosed in open and close parentheses so as to be stored in the input buffer and so as to act as a unit operand assembly. The content of the input buffer is further displayed on the LCD.

Next, the flow chart will be explained. First, the rclf flag for storing depressing or not depressing of the [rcl] key is cleared (step S1): that is, the rclf is set to "0". When the rclf is "0", it means that the [rcl] key was not depressed. When the rclf is "1", on the other hand, it means the [rcl] key was depressed. Next, the presence of a keystroke is examined (step S2). When there was no keystroke, the step S2 is repeated to wait for a coming entry.

When there was a keystroke, it is examined whether the key depressed is the [rcl] key or not (step S3).

When the key depressed is the [rcl] key, the rclf is set to "1" to store the depression of the [rcl] key (step S4), then returning to the step S2.

When the key depressed is not the [rcl] key, it is further examined that the key depressed is the [memory name] key or not (step S5). When the key depressed is not the [memory name] key, processing is carried out depending on which key was depressed (PROCESSING FOR INDIVIDUAL KEY) (step S10) to proceed to displaying (step S12), then returning to the step S1.

When the key depressed is the [memory name] key, it is examined whether the [rcl] key was depressed immediately before the depression of the [memory name] key or not (step S6), thus examining whether the rclf flag is "1" or not. When the rclf flag is "0" (which means that the [rcl] key was not depressed), a memory name is entered to the input buffer and a process other than a memory call is carried out in accordance with individual states (step S11) to proceed to displaying (step S12), then returning to the step S1. When the rclf flag is "1" (which means that the [rcl] key was depressed), the input buffer successively stores the "(" (step S7), data which was stored in a specified memory name (step S8), and the ")" (step S9) therein. After that, the content of the input buffer is displayed (step S12), then returning to the step S1.

Figure 4:
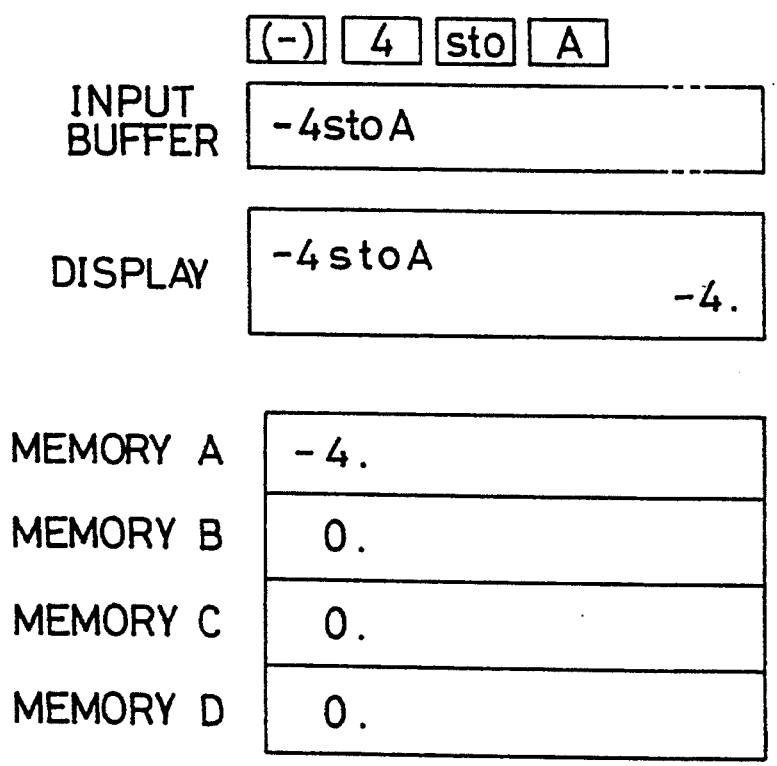
FIG. 4 is a view illustrating a method of storing numeric values with the embodiment of the present invention.

The foregoing procedures enable stored numeric values and expressions to be read and displayed. Below, an embodiment using the procedures will be described. Here, as shown in FIG. 4, "−4" is preliminarily stored in the memory name "A". That is, "−4" was stored in the memory name "A" by successively depressing the

[(−)] key, [4] key, [sto] key, and [A] key as well as the −4, sto, and A were successively stored in the input buffer to be displayed.

Figure 5:
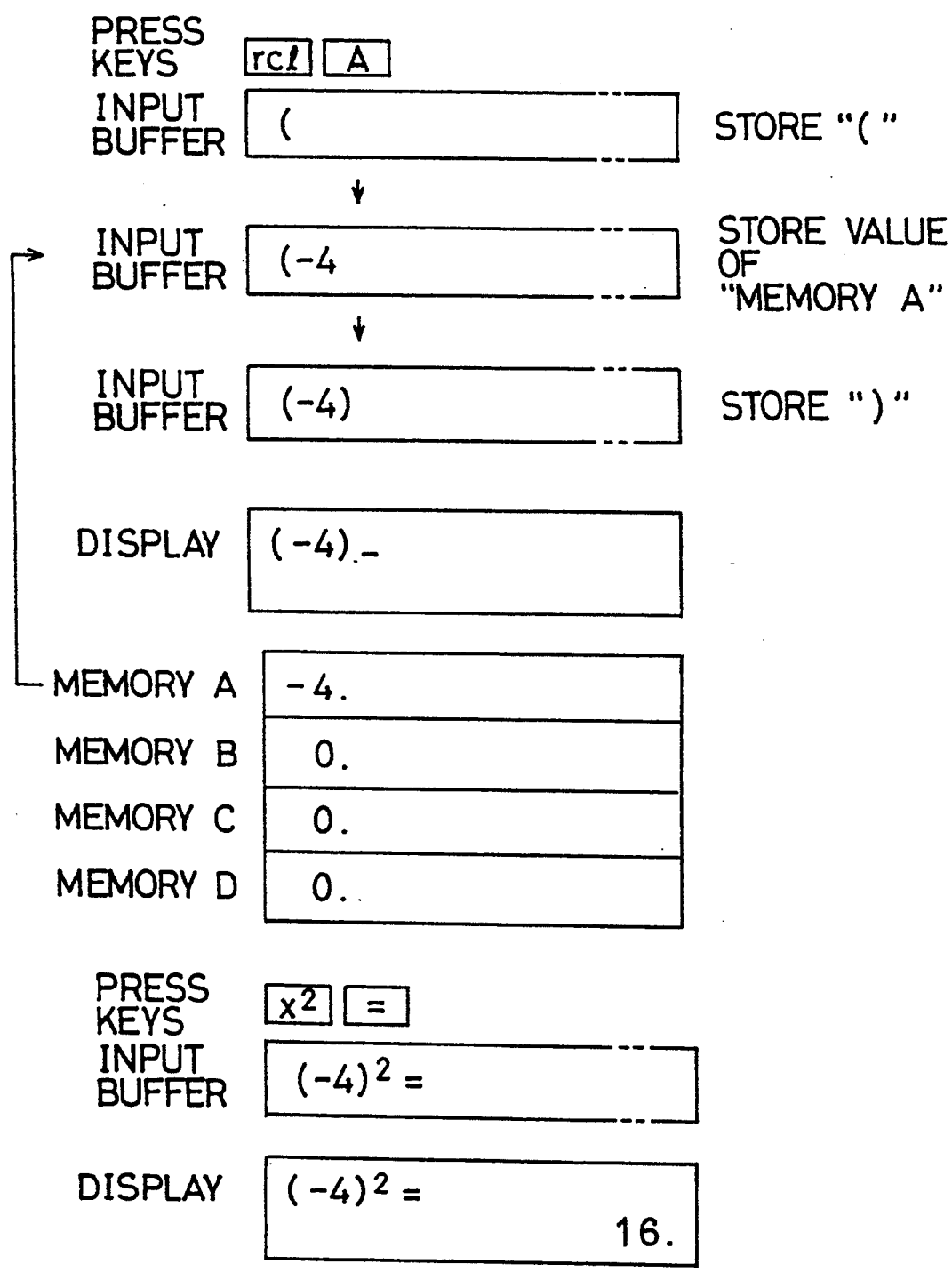
FIG. 5 is a view illustrating a method of reading out numeric values for display with the embodiment of the present invention.

After depressing the key [rcl], the memory name "A" is inputted in order to read out the numeric value (−4, in this case) stored in tile memory name "A", as shown in FIG. 5. The procedure reads out the content of the memory to be stored in the input buffer. The procedure allows the open parenthesis "(", the numeric value "−4" stored in the memory name "A", and the close parenthesis ")" to be stored successively in the input buffer. The content of the input buffer, which is "(−4)", is also displayed, as shown in FIG. 5.

Subsequently, the square key [X²] and [=] key are successively entered as shown in FIG. 5 in order to provide the result by squaring the numeric value read from the memory. The procedure allows the operations of square and equal to be stored in the input buffer, so that operations are carried out in accordance with the operational priority of the function while analyzing the data in the input buffer. In this case, the operations of square and equal are carried out with "(−4)", which was previously inputted before the [X²] key and [=] key were depressed, so as to provide 16 as the result. Here, the operational content of the input buffer "(−4)²=" and its result "16" are displayed as shown in FIG. 5.

As described above, when operations are carried out by reading stored numeric values, enclosing a numeric value in open and close parentheses defines an operand assembly having the order of operation of the sign preceding to the numeric value, which consequently eliminates the possibility of obtaining the operational result which is different from the intended one due to the operational priority of the function.

What is claimed is:

1. A scientific electronic calculator for performing mathematical operations with a predetermined priority in the performance, said calculator comprising:
    an input means for inputting to the calculator operational information including numeral, numeral term, or numeral expression operands and operators;
    a control means operably connected to said input means for controlling the input of operational information, operations and displays;
    a display means operably connected to said control means for displaying input operational information and results of performed mathematical operations;
    a first storage means operably connected to said control means for storing a program of sequential operations to be executed by said control means;
    a second storage means operably connected to said control means including a plurality of storages for storing numeral, numeral term, or numeral expression operands; and
    a storage and display buffer means operably connected to said control means for storing an operand assembly having an order of a parenthesis open, a numeral, numeral term or numeral expression operand stored in said second storage means, and a parenthesis close;
    whereby said control means, in response to an instruction by said input means to display a numeral, numeral term or numeral expression operand stored in said second storage means in said display means, instructs the operand assembly stored in the storage and display buffer means to be displayed in the display means.

2. A scientific electronic calculator according to claim 1, wherein said input means comprises a read key for instructing a specific read out of said numeral, numeral term or expression operand stored in said second storage means, and a choice key for choosing a said storage in said plurality of storages of said second storage means.

* * * * *